(12) United States Patent
Castiglione

(10) Patent No.: US 9,407,858 B2
(45) Date of Patent: Aug. 2, 2016

(54) VOICEOVER SYSTEM AND METHOD

(71) Applicant: Custom Solutions Group, LLC, Royal Oak, MI (US)

(72) Inventor: Anthony S. Castiglione, Birmingham, MI (US)

(73) Assignee: Custom Solutions Group, LLC, Royal Oak, MI (US)

( * ) Notice: Subject to any disclaimer, the term of this patent is extended or adjusted under 35 U.S.C. 154(b) by 64 days.

(21) Appl. No.: 14/600,905

(22) Filed: Jan. 20, 2015

(65) Prior Publication Data

US 2015/0208020 A1 Jul. 23, 2015

Related U.S. Application Data

(60) Provisional application No. 61/929,422, filed on Jan. 20, 2014.

(51) Int. Cl.
*H04N 9/80* (2006.01)
*H04N 5/76* (2006.01)
*G06F 17/30* (2006.01)
*H04N 5/272* (2006.01)
*H04N 9/82* (2006.01)

(52) U.S. Cl.
CPC ............ *H04N 5/76* (2013.01); *G06F 17/30017* (2013.01); *G06F 17/30817* (2013.01); *H04N 5/272* (2013.01); *H04N 9/8205* (2013.01); *H04N 9/8211* (2013.01); *H04N 2201/328* (2013.01)

(58) Field of Classification Search
CPC ......... H04N 5/76; H04N 5/272; H04N 5/775; G06F 17/30017; G06F 17/30817
USPC ......... 386/239, 241, 245, 246, 248, 337, 338, 386/339, 343, 351
See application file for complete search history.

(56) References Cited

U.S. PATENT DOCUMENTS

2009/0144080 A1* 6/2009 Gray ................... G06F 19/3481 705/2

\* cited by examiner

*Primary Examiner* — Robert Chevalier
(74) *Attorney, Agent, or Firm* — Kinney & Lange, P.A.

(57) ABSTRACT

A method of obtaining feedback on performance of an activity includes creating an input audio/video file or stream of performance of an activity, and providing the input audio/video file or stream to an evaluator. The evaluator inserts feedback in the input audio/video file or stream to create a feedback-annotated audio/video file. The feedback-annotated audio/video file includes at least one pause break during which audio commentary and/or graphical information inserted by the evaluator are presented while audio and video of the input audio/video file or stream are paused.

13 Claims, 4 Drawing Sheets

VOICEOVER SYSTEM AND METHOD

CROSS-REFERENCE TO RELATED APPLICATION(S)

This application claims the benefit of U.S. Provisional Application No. 61/929,422 filed Jan. 20, 2014 for "VOICEOVER SYSTEM AND METHOD" by T. Castiglione, which is hereby incorporated by reference in its entirety.

BACKGROUND

It can be desirable in a number of applications to insert audio and/or graphical information into an audio/video file or stream, and to provide the ability to play back the audio/video file or stream with the inserted audio and/or graphical information included in the playback. For many possible applications, the provision of this capability could allow the way that business is done, or the way that evaluation is performed, to be improved or changed. The system for inserting the audio and/or graphical information should be simple to use for the evaluator, and playback should be synchronized so that the inserted information appears at the appropriate time for properly conveying the feedback being provided by the evaluator.

SUMMARY

A method of obtaining feedback on performance of an activity includes creating an input audio/video file or stream of performance of an activity, and providing the input audio/video file or stream to an evaluator. The evaluator inserts feedback in the input audio/video file or stream to create a feedback-annotated audio/video file. The feedback-annotated audio/video file includes at least one pause break during which audio commentary and/or graphical information inserted by the evaluator are presented while audio and video of the input audio/video file or stream are paused.

DETAILED DESCRIPTION

According to various embodiments of the present invention, a computerized system employing at least a processor, a memory and a multimedia display, provides the capability for an evaluating and providing feedback, coaching, or other information for an audio/video file or stream. The feedback may be in the form of audio and/or graphical information inserted into the audio/video file or stream.

One example of an application where this ability is desirable is in the context of pharmaceutical (or other) sales, so that a pharmaceutical representative can record a live or simulated interaction with a doctor and receive feedback on their sales presentation from a third party evaluator. Another example may be allowing a junior associate attorney to record simulated opening/closing remarks for a case or another type of oral presentation, so that a senior attorney or designated evaluator, possibly in another physical location or office, may review the recorded material and give feedback. A further example is in the context of virtual online horse shows and coaching. In this example, it is possible for riders to video their own performance, and then upload the video to a website for evaluation. When the video is submitted for participation in an online horse show, competitors receive a complete scorecard with detailed comments by one or more judges, who analyze the performance and outline how the rider placed in the class, the reason for that placement, and how the rider can improve in his/her next ride. Through this feedback, riders can assess their horse's readiness for live competition as well as compete against others from around the country and throughout the world. In another related example, the video may also be submitted for the purpose of receiving coaching, which allows riders and trainers to work together at any time, regardless of where they are located. Trainers in this context are able to review the video and provide instruction that is created in real-time and is synchronized with the video. This example is applicable to any skill-based activity in which it is useful for a coach or trainer to provide feedback on a recorded video of performance of a skill. There are numerous other examples of applications that could beneficially employ the ability to insert audio and/or graphical information into an audio/video file or stream, and to play back the inserted audio and/or graphical information with the playback of the audio/video file or stream, as well.

Figure 1:
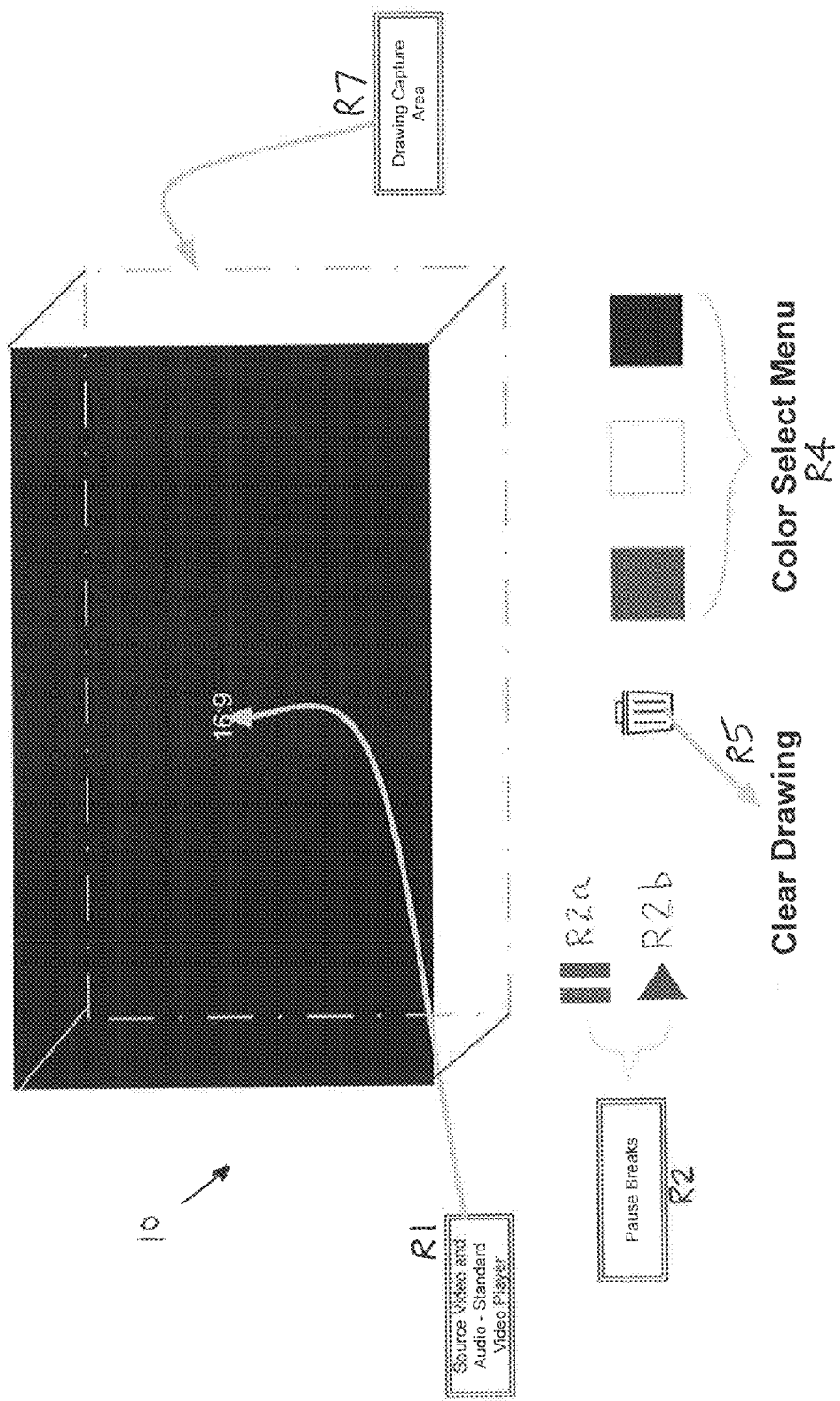
FIG. 1 is a diagram illustrating an evaluation interface for allowing insertion of audio and/or graphical information into an audio/video file or stream according to an embodiment of the present invention.

FIG. 1 is a diagram illustrating evaluation interface 10 for allowing insertion of audio and/or graphical information into an audio/video file or stream according to an embodiment of the present invention. Evaluation interface 10 includes window R1 for displaying the source audio/video file or stream, and a menu of options for allowing an evaluator to insert audio and/or graphical information into the audio/video file or stream. The evaluator menu options include pause breaks sub-menu R2, which includes freeze video button R2a and resume video button R2b, color select sub-menu R4, which includes a plurality of colors that can be selected to initiate a graphical drawing function, and clear drawing button R5. The graphical drawing function allows the evaluator to draw in a selected color in drawing capture area R7, which overlays the source audio/video file or stream.

The software application that employs evaluation interface 10 logs a user's interaction with a video on web/mobile devices and/or on more traditional computer devices. For example, the user may be a judge, trainer, evaluator, or another reviewing party that is given the ability to record audio commentary and/or insert graphical information while reviewing the video. When enabled, the reviewer can pause the video and the system will track the time the video was paused and the duration it was paused for—this action can occur many times during the watching of a video—and all of these interactions are stored as an array of events (or as another appropriately defined and labeled file).

Once completed, the event array is available to the software application, which then reads it, adds the appropriate amount of time to the video (original time+sum of all pause durations) and plays the video back with the pause breaks.

In an exemplary use of the software application, an evaluator assigned to an online course has the task of reviewing student video submissions to that course, which may be provided in an exemplary embodiment by uploading the submission file to a designated web page. After logging in to the application and selecting a pending video submission from a dashboard interface, the evaluator is directed to evaluation interface 10. The evaluator will watch a video (submitted by the student) and will simultaneously record an audio commentary and/or insert graphical information that relates to the video's content. The evaluator cannot listen and talk at the same time, so evaluation interface 10 is used to pause the video at desired increments while recording an audio track or inserting graphical information in the video. By using evaluation interface 10, the software application tracks the evaluator's commanded pauses, logs the times and durations of the pauses, and stores this data in a manner that can be referenced during playback. Therefore, when the evaluator has completed the evaluation, the software application has a set of instructions that indicate when to pause the video on playback while keeping the video synchronized with the audio recording.

When the evaluation begins, the system automatically enables the device microphone and begins recording audio in the background in an audio stream overlay. This audio recording remains active until the user stops their evaluation. Each time a user invokes the 'freeze video' option (freeze video button R2a), the software application creates a new item for the pause break event array. On press of the freeze video button, the start time is captured based on the current time of the audio stream overlay being recorded by the user. A start time signal is then passed to a counter that counts the time until the user presses the 'resume video' button R2b. At this point, the stop time (recorded audio stream overlay time when the resume video button is pressed) and the time from the counter is added into the array item and placed in the array.

An example of a pause break array with two freeze video and resume video events is as follows:

[{"start":4.487944006919861,"end": 18.56167095899582,"stopTime":14.0737269 5207596}, {"start":21.10003596544266,"end":33.36842900514603, "stopTime":12.26839303970 337}]

Figure 2:
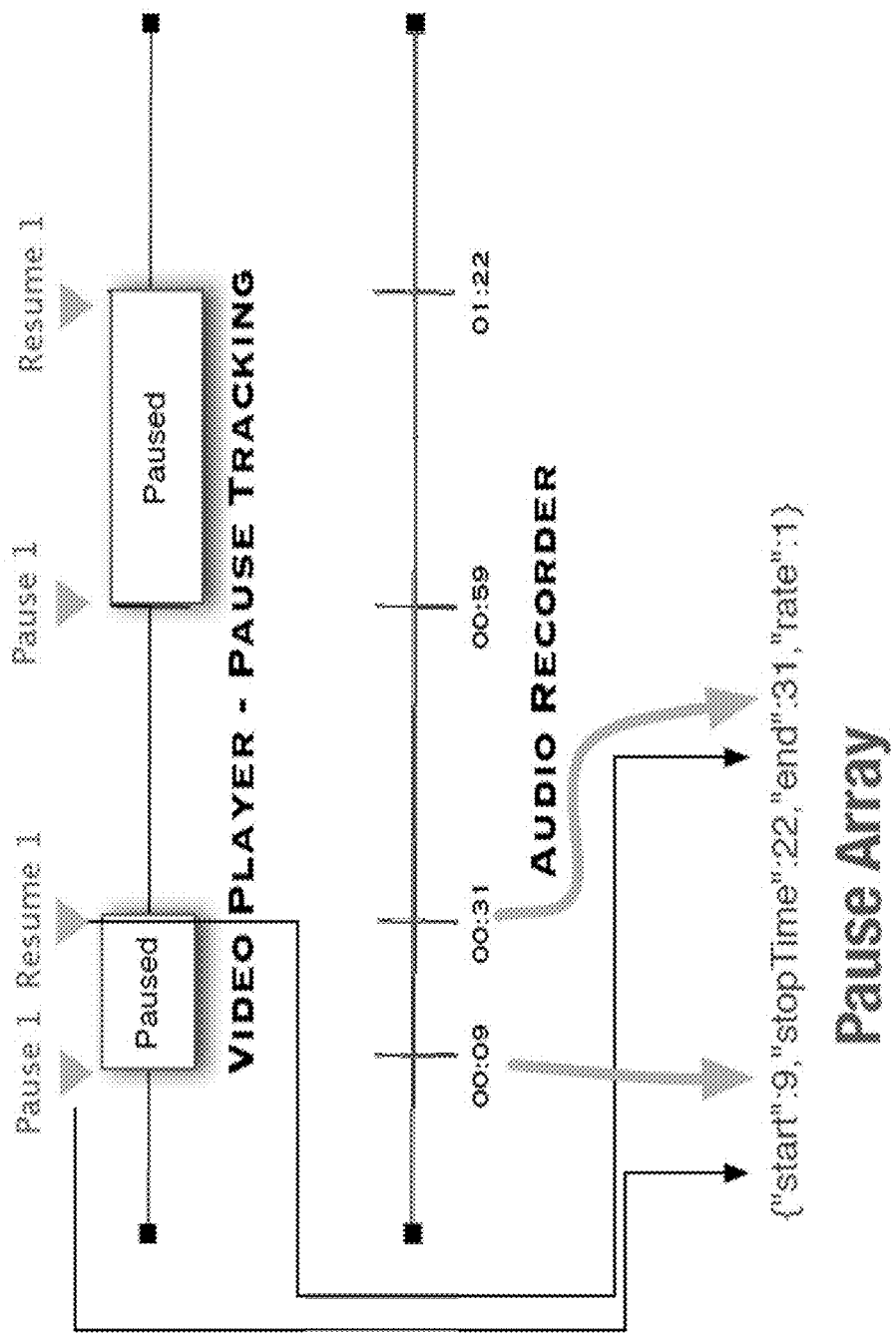
FIG. 2 is a diagram illustrating a timeline of events associated with a pause break array.

FIG. 2 is a diagram illustrating a timeline of the events giving rise to the pause break array described above.

Referring again to FIG. 1, an evaluator or other user also has the option to insert graphical information to overlay the audio/video file being reviewed and evaluated, by utilizing the drawing function associated with evaluation interface 10 of the software application. The drawing function is executed by using a finger or stylus directly on the screen within the bounds of video window R1, where hidden overlay layer R7 is active during an evaluation session. The software application tracks the movements of the finger or stylus can captures each position change at a selected time interval, such as every 0.01 second in an exemplary embodiment.

In operation, the evaluator initiates a drawing function by selecting a drawing color in color select sub-menu R4. The initiation of the drawing function may automatically insert a pause break in the event array, or a pause may only be inserted upon selection of freeze video button R2a, similar to the way a pause is inserted in the process of recording audio commentary described above. Once a color is selected, a stroke with a finger or stylus is recorded as a series of events in a drawing array. After the drawing is complete, the evaluator may clear all drawings in overlay layer R7 by pressing clear drawing button R5, which will also be stored in the drawing array.

An example of a drawing array dictionary is as follows:

```
{//draw data (dictionary)
    "actionsets": [//point data (array)
        {
            "type": 0,          //stroke start
            "interval": 631.3009,   //time (index) in
                                    milliseconds
(Index: 0)  "actionType": 1,    //1 = stroke action
            "y": 291,           //x coord
            "x": 82             //y coord
        },
        {
            "type": 1,          //stroke following
            "interval": 649.0431,
(Index: 1)      "actionType": 1,
            "y": 288,
            "x": 78
        },
        {
            "interval": 2250.427,   //time (index) in ms
(Index: 2)  "actionType": 2,    //2 = change color action
            "color": "rgb(255, 255, 255)"  //selected color
        },
        {
            "type": 0,
            "interval": 2832.28,
(Index: 3)  "actionType": 1,
            "y": 425,
            "x": 253
        },
        {
            "type": 1,
            "interval": 2888.189,
(Index: 4)  "actionType": 1,
            "y": 416,
            "x": 255
        }
    ],
    "clearTime": [ //clear action time (array)
        4.830485,
        10.31316
    ],
    "clearData": [ //clear action index in draw data (array)
        4,
        8
    ]
}
```

In the example drawing array dictionary shown above, the various lines in the array illustrate the syntax of action sets that may be defined in the array. The lines indicated as "Index: 0" are an example of the start of a first drawing stroke (identified as type 0). The lines indicated as "Index: 1" are an example of the continuation or following of the first drawing stroke (identified as type 1). The lines indicated as "Index: 2" are an example of a change color action. The lines indicated as "Index: 3" are an example of the start of a second drawing stroke, and the lines indicated as "Index: 4" are an example of the continuation or following of the second drawing stroke. The "clearTime" and "clearData" lines are commands that indicate when the drawing will be cleared—in the case of "clearTime," the drawing is displayed from time index 4.830485 until it is cleared at time index 10.31316, and in the case of "clearData," the drawing is displayed from "Index: 4" until "Index: 8" (an action set not shown in the drawing array dictionary example shown).

Below is a detailed drawing array listing for an example drawing action in which a user draws two distinct shapes, each followed by a clear action. This example shows the capturing of drawing movements at selected time intervals to define the entire drawing executed by the user.

{"actionsets": [{"type":0,"interval":6038,"actionType":1,"y":121,"x":338}, {"type":1,"interval":6236,"actionType":1,"y":121,"x":336}, -continued {"type":1,"interval":6322,"actionType":1,"y":121,"x":331},
{"type":1,"interval":6353,"actionType":1,"y":121,"x":327},
{"type":1,"interval":6392,"actionType":1,"y":121,"x":321},
{"type":1,"interval":6436,"actionType":1,"y":121,"x":316},
{"type":1,"interval":6460,"actionType":1,"y":121,"x":315},
{"type":1,"interval":6508,"actionType":1,"y":121,"x":309},
{"type":1,"interval":6537,"actionType":1,"y":121,"x":305},
{"type":1,"interval":6590,"actionType":1,"y":121,"x":303},
{"type":1,"interval":6636,"actionType":1,"y":121,"x":295},
{"type":1,"interval":6659,"actionType":1,"y":121,"x":293},
{"type":1,"interval":6708,"actionType":1,"y":121,"x":290},
{"type":1,"interval":6737,"actionType":1,"y":121,"x":288},
{"type":1,"interval":6759,"actionType":1,"y":121,"x":287},
{"type":1,"interval":6786,"actionType":1,"y":121,"x":286},
{"type":1,"interval":6803,"actionType":1,"y":121,"x":285},
{"type":1,"interval":6857,"actionType":1,"y":121,"x":283},
{"type":1,"interval":6888,"actionType":1,"y":121,"x":281},
{"type":1,"interval":6927,"actionType":1,"y":121,"x":280},
{"type":1,"interval":6953,"actionType":1,"y":121,"x":277},
{"type":1,"interval":7003,"actionType":1,"y":121,"x":275},
{"type":1,"interval":7021,"actionType":1,"y":121,"x":272},
{"type":1,"interval":7053,"actionType":1,"y":121,"x":270},
{"type":1,"interval":7069,"actionType":1,"y":121,"x":269},
{"type":1,"interval":7086,"actionType":1,"y":121,"x":268},
{"type":1,"interval":7124,"actionType":1,"y":121,"x":265},
{"type":1,"interval":7170,"actionType":1,"y":121,"x":263},
{"type":1,"interval":7203,"actionType":1,"y":122,"x":260},
{"type":1,"interval":7219,"actionType":1,"y":122,"x":258},
{"type":1,"interval":7253,"actionType":1,"y":122,"x":257},
{"type":1,"interval":7286,"actionType":1,"y":122,"x":256},
{"type":1,"interval":7302,"actionType":1,"y":123,"x":256},
{"type":1,"interval":7348,"actionType":1,"y":123,"x":254},
{"type":1,"interval":7387,"actionType":1,"y":123,"x":253},
{"type":1,"interval":7420,"actionType":1,"y":123,"x":252},
{"type":1,"interval":7437,"actionType":1,"y":125,"x":252},
{"type":1,"interval":7454,"actionType":1,"y":125,"x":251},
{"type":1,"interval":7470,"actionType":1,"y":126,"x":249},
{"type":1,"interval":7487,"actionType":1,"y":127,"x":248},
{"type":1,"interval":7521,"actionType":1,"y":128,"x":248},
{"type":1,"interval":7553,"actionType":1,"y":128,"x":247},
{"type":1,"interval":7570,"actionType":1,"y":131,"x":247},
{"type":1,"interval":7621,"actionType":1,"y":132,"x":247},
{"type":1,"interval":7670,"actionType":1,"y":133,"x":247},
{"type":1,"interval":7704,"actionType":1,"y":135,"x":247},
{"type":1,"interval":7738,"actionType":1,"y":137,"x":246},
{"type":1,"interval":7788,"actionType":1,"y":140,"x":246},
{"type":1,"interval":7837,"actionType":1,"y":141,"x":246},
{"type":1,"interval":7870,"actionType":1,"y":144,"x":244},
{"type":1,"interval":7887,"actionType":1,"y":146,"x":244},
{"type":1,"interval":7921,"actionType":1,"y":147,"x":243},
{"type":1,"interval":7954,"actionType":1,"y":148,"x":243},
{"type":1,"interval":7970,"actionType":1,"y":149,"x":243},
{"type":1,"interval":7987,"actionType":1,"y":152,"x":242},
{"type":1,"interval":8021,"actionType":1,"y":153,"x":242},
{"type":1,"interval":8070,"actionType":1,"y":156,"x":240},
{"type":1,"interval":8087,"actionType":1,"y":157,"x":239},
{"type":1,"interval":8139,"actionType":1,"y":158,"x":239},
{"type":1,"interval":8187,"actionType":1,"y":163,"x":238},
{"type":1,"interval":8203,"actionType":1,"y":165,"x":238},
{"type":1,"interval":8238,"actionType":1,"y":169,"x":236},
{"type":1,"interval":8271,"actionType":1,"y":171,"x":236},
{"type":1,"interval":8287,"actionType":1,"y":174,"x":236},
{"type":1,"interval":8321,"actionType":1,"y":177,"x":235},
{"type":1,"interval":8337,"actionType":1,"y":179,"x":235},
{"type":1,"interval":8357,"actionType":1,"y":180,"x":235},
{"type":1,"interval":8405,"actionType":1,"y":186,"x":235},
{"type":1,"interval":8437,"actionType":1,"y":189,"x":235},
{"type":1,"interval":8487,"actionType":1,"y":195,"x":235},
{"type":1,"interval":8504,"actionType":1,"y":196,"x":235},
{"type":1,"interval":8537,"actionType":1,"y":197,"x":235},
{"type":1,"interval":8588,"actionType":1,"y":203,"x":235},
{"type":1,"interval":8621,"actionType":1,"y":207,"x":235},
{"type":1,"interval":8637,"actionType":1,"y":208,"x":235},
{"type":1,"interval":8653,"actionType":1,"y":211,"x":235},
{"type":1,"interval":8688,"actionType":1,"y":215,"x":235},
{"type":1,"interval":8721,"actionType":1,"y":217,"x":235},
{"type":1,"interval":8738,"actionType":1,"y":219,"x":235},
{"type":1,"interval":8772,"actionType":1,"y":221,"x":235},
{"type":1,"interval":8804,"actionType":1,"y":225,"x":235}, {"type":1,"interval":8821,"actionType":1,"y":226,"x":235},
{"type":1,"interval":8854,"actionType":1,"y":229,"x":235},
{"type":1,"interval":8871,"actionType":1,"y":230,"x":235},
{"type":1,"interval":8888,"actionType":1,"y":233,"x":235},
{"type":1,"interval":8921,"actionType":1,"y":236,"x":235},
{"type":1,"interval":8955,"actionType":1,"y":238,"x":235},
{"type":1,"interval":8972,"actionType":1,"y":242,"x":235},
{"type":1,"interval":9005,"actionType":1,"y":247,"x":235},
{"type":1,"interval":9038,"actionType":1,"y":251,"x":235},
{"type":1,"interval":9071,"actionType":1,"y":252,"x":235},
{"type":1,"interval":9088,"actionType":1,"y":253,"x":235},
{"type":1,"interval":9122,"actionType":1,"y":255,"x":235},
{"type":1,"interval":9139,"actionType":1,"y":257,"x":235},
{"type":1,"interval":9170,"actionType":1,"y":259,"x":235},
{"type":1,"interval":9221,"actionType":1,"y":264,"x":235},
{"type":1,"interval":9238,"actionType":1,"y":265,"x":235},
{"type":1,"interval":9288,"actionType":1,"y":267,"x":235},
{"type":1,"interval":9355,"actionType":1,"y":267,"x":237},
{"type":1,"interval":9471,"actionType":1,"y":267,"x":238},
{"type":1,"interval":9520,"actionType":1,"y":267,"x":239},
{"type":1,"interval":9587,"actionType":1,"y":267,"x":241},
{"type":1,"interval":9604,"actionType":1,"y":267,"x":245},
{"type":1,"interval":9621,"actionType":1,"y":267,"x":248},
{"type":1,"interval":9656,"actionType":1,"y":268,"x":249},
{"type":1,"interval":9688,"actionType":1,"y":270,"x":251},
{"type":1,"interval":9704,"actionType":1,"y":271,"x":253},
{"type":1,"interval":9721,"actionType":1,"y":272,"x":258},
{"type":1,"interval":9738,"actionType":1,"y":274,"x":263},
{"type":1,"interval":9755,"actionType":1,"y":275,"x":265},
{"type":1,"interval":9804,"actionType":1,"y":278,"x":270},
{"type":1,"interval":9821,"actionType":1,"y":278,"x":271},
{"type":1,"interval":9838,"actionType":1,"y":279,"x":274},
{"type":1,"interval":9855,"actionType":1,"y":279,"x":275},
{"type":1,"interval":9889,"actionType":1,"y":279,"x":276},
{"type":1,"interval":9920,"actionType":1,"y":280,"x":278},
{"type":1,"interval":9938,"actionType":1,"y":280,"x":279},
{"type":1,"interval":9955,"actionType":1,"y":280,"x":281},
{"type":1,"interval":9989,"actionType":1,"y":280,"x":284},
{"type":1,"interval":10006,"actionType":1,"y":280,"x":285},
{"type":1,"interval":10038,"actionType":1,"y":280,"x":290},
{"type":1,"interval":10055,"actionType":1,"y":280,"x":292},
{"type":1,"interval":10071,"actionType":1,"y":280,"x":294},
{"type":1,"interval":10089,"actionType":1,"y":280,"x":295},
{"type":1,"interval":10105,"actionType":1,"y":280,"x":296},
{"type":1,"interval":10122,"actionType":1,"y":280,"x":298},
{"type":1,"interval":10140,"actionType":1,"y":280,"x":299},
{"type":1,"interval":10158,"actionType":1,"y":280,"x":301},
{"type":1,"interval":10189,"actionType":1,"y":280,"x":302},
{"type":1,"interval":10205,"actionType":1,"y":280,"x":305},
{"type":1,"interval":10221,"actionType":1,"y":280,"x":307},
{"type":1,"interval":10238,"actionType":1,"y":280,"x":308},
{"type":1,"interval":10255,"actionType":1,"y":280,"x":309},
{"type":1,"interval":10288,"actionType":1,"y":280,"x":314},
{"type":1,"interval":10305,"actionType":1,"y":280,"x":315},
{"type":1,"interval":10321,"actionType":1,"y":280,"x":317},
{"type":1,"interval":10338,"actionType":1,"y":280,"x":320},
{"type":1,"interval":10355,"actionType":1,"y":280,"x":321},
{"type":1,"interval":10388,"actionType":1,"y":280,"x":324},
{"type":1,"interval":10405,"actionType":1,"y":280,"x":327},
{"type":1,"interval":10421,"actionType":1,"y":280,"x":330},
{"type":1,"interval":10438,"actionType":1,"y":280,"x":331},
{"type":1,"interval":10489,"actionType":1,"y":280,"x":334},
{"type":1,"interval":10505,"actionType":1,"y":280,"x":340},
{"type":1,"interval":10521,"actionType":1,"y":280,"x":344},
{"type":1,"interval":10538,"actionType":1,"y":278,"x":345},
{"type":1,"interval":10555,"actionType":1,"y":278,"x":348},
{"type":1,"interval":10589,"actionType":1,"y":278,"x":351},
{"type":1,"interval":10605,"actionType":1,"y":278,"x":352},
{"type":1,"interval":10639,"actionType":1,"y":278,"x":355},
{"type":1,"interval":10656,"actionType":1,"y":278,"x":357},
{"type":1,"interval":10689,"actionType":1,"y":278,"x":361},
{"type":1,"interval":10722,"actionType":1,"y":278,"x":365},
{"type":1,"interval":10739,"actionType":1,"y":278,"x":366},
{"type":1,"interval":10756,"actionType":1,"y":278,"x":369},
{"type":1,"interval":10788,"actionType":1,"y":278,"x":371},
{"type":1,"interval":10805,"actionType":1,"y":278,"x":372},
{"type":1,"interval":10822,"actionType":1,"y":277,"x":373},
{"type":1,"interval":10838,"actionType":1,"y":277,"x":376},
{"type":1,"interval":10863,"actionType":1,"y":277,"x":379},

```
{"type":1,"interval":10906,"actionType":1,"y":277,"x":380},
{"type":1,"interval":10922,"actionType":1,"y":277,"x":383},
{"type":1,"interval":10939,"actionType":1,"y":277,"x":385},
{"type":1,"interval":10988,"actionType":1,"y":277,"x":389},
{"type":1,"interval":11004,"actionType":1,"y":277,"x":390},
{"type":1,"interval":11022,"actionType":1,"y":277,"x":392},
{"type":1,"interval":11039,"actionType":1,"y":277,"x":393},
{"type":1,"interval":11089,"actionType":1,"y":277,"x":395},
{"type":1,"interval":11105,"actionType":1,"y":275,"x":396},
{"type":1,"interval":11122,"actionType":1,"y":274,"x":401},
{"type":1,"interval":11155,"actionType":1,"y":274,"x":402},
{"type":1,"interval":11189,"actionType":1,"y":272,"x":406},
{"type":1,"interval":11205,"actionType":1,"y":272,"x":408},
{"type":1,"interval":11222,"actionType":1,"y":272,"x":409},
{"type":1,"interval":11238,"actionType":1,"y":270,"x":409},
{"type":1,"interval":11255,"actionType":1,"y":269,"x":411},
{"type":1,"interval":11289,"actionType":1,"y":266,"x":412},
{"type":1,"interval":11321,"actionType":1,"y":263,"x":413},
{"type":1,"interval":11339,"actionType":1,"y":261,"x":413},
{"type":1,"interval":11356,"actionType":1,"y":260,"x":415},
{"type":1,"interval":11389,"actionType":1,"y":254,"x":415},
{"type":1,"interval":11406,"actionType":1,"y":252,"x":415},
{"type":1,"interval":11439,"actionType":1,"y":247,"x":415},
{"type":1,"interval":11456,"actionType":1,"y":246,"x":415},
{"type":1,"interval":11489,"actionType":1,"y":242,"x":415},
{"type":1,"interval":11505,"actionType":1,"y":239,"x":415},
{"type":1,"interval":11521,"actionType":1,"y":236,"x":415},
{"type":1,"interval":11539,"actionType":1,"y":234,"x":415},
{"type":1,"interval":11590,"actionType":1,"y":225,"x":415},
{"type":1,"interval":11623,"actionType":1,"y":220,"x":416},
{"type":1,"interval":11639,"actionType":1,"y":217,"x":416},
{"type":1,"interval":11671,"actionType":1,"y":214,"x":416},
{"type":1,"interval":11705,"actionType":1,"y":210,"x":416},
{"type":1,"interval":11723,"actionType":1,"y":202,"x":416},
{"type":1,"interval":11772,"actionType":1,"y":189,"x":416},
{"type":1,"interval":11789,"actionType":1,"y":185,"x":416},
{"type":1,"interval":11840,"actionType":1,"y":179,"x":416},
{"type":1,"interval":11873,"actionType":1,"y":177,"x":416},
{"type":1,"interval":11939,"actionType":1,"y":176,"x":416},
{"type":1,"interval":11956,"actionType":1,"y":173,"x":416},
{"type":1,"interval":11989,"actionType":1,"y":166,"x":415},
{"type":1,"interval":12006,"actionType":1,"y":164,"x":415},
{"type":1,"interval":12039,"actionType":1,"y":157,"x":412},
{"type":1,"interval":12073,"actionType":1,"y":155,"x":412},
{"type":1,"interval":12122,"actionType":1,"y":146,"x":408},
{"type":1,"interval":12156,"actionType":1,"y":141,"x":406},
{"type":1,"interval":12189,"actionType":1,"y":135,"x":405},
{"type":1,"interval":12345,"actionType":1,"y":134,"x":404},
{"type":1,"interval":12391,"actionType":1,"y":134,"x":403},
{"type":1,"interval":12439,"actionType":1,"y":131,"x":403},
{"type":1,"interval":12472,"actionType":1,"y":130,"x":401},
{"type":1,"interval":12489,"actionType":1,"y":127,"x":400},
{"type":1,"interval":12506,"actionType":1,"y":126,"x":400},
{"type":1,"interval":12556,"actionType":1,"y":124,"x":400},
{"type":1,"interval":12624,"actionType":1,"y":122,"x":398},
{"type":1,"interval":12657,"actionType":1,"y":121,"x":397},
{"type":1,"interval":12690,"actionType":1,"y":118,"x":396},
{"type":1,"interval":12722,"actionType":1,"y":117,"x":396},
{"type":1,"interval":12756,"actionType":1,"y":116,"x":395},
{"type":1,"interval":12773,"actionType":1,"y":115,"x":393},
{"type":1,"interval":12806,"actionType":1,"y":113,"x":392},
{"type":1,"interval":12839,"actionType":1,"y":112,"x":391},
{"type":1,"interval":12856,"actionType":1,"y":111,"x":388},
{"type":1,"interval":12890,"actionType":1,"y":110,"x":385},
{"type":1,"interval":12906,"actionType":1,"y":110,"x":384},
{"type":1,"interval":12922,"actionType":1,"y":110,"x":383},
{"type":1,"interval":12940,"actionType":1,"y":108,"x":381},
{"type":1,"interval":12990,"actionType":1,"y":108,"x":379},
{"type":1,"interval":13023,"actionType":1,"y":108,"x":378},
{"type":1,"interval":13040,"actionType":1,"y":108,"x":377},
{"type":1,"interval":13073,"actionType":1,"y":108,"x":376},
{"type":1,"interval":13089,"actionType":1,"y":108,"x":375},
{"type":1,"interval":13123,"actionType":1,"y":108,"x":374},
{"type":1,"interval":13158,"actionType":1,"y":109,"x":372},
{"type":1,"interval":13190,"actionType":1,"y":110,"x":369},
{"type":1,"interval":13239,"actionType":1,"y":112,"x":366},
{"type":1,"interval":13273,"actionType":1,"y":113,"x":365},
{"type":1,"interval":13290,"actionType":1,"y":115,"x":362},
{"type":1,"interval":13340,"actionType":1,"y":116,"x":360},
{"type":1,"interval":13374,"actionType":1,"y":116,"x":359},
{"type":1,"interval":13407,"actionType":1,"y":117,"x":356},
{"type":1,"interval":13440,"actionType":1,"y":117,"x":355},
{"type":1,"interval":13490,"actionType":1,"y":117,"x":352},
{"type":1,"interval":13540,"actionType":1,"y":117,"x":351},
{"type":1,"interval":13557,"actionType":1,"y":117,"x":350},
{"type":1,"interval":13607,"actionType":1,"y":117,"x":349},
{"type":1,"interval":13623,"actionType":1,"y":117,"x":348},
{"type":1,"interval":13656,"actionType":1,"y":117,"x":347},
{"type":1,"interval":13701,"actionType":1,"y":117,"x":346},
{"type":1,"interval":13806,"actionType":1,"y":117,"x":345},
{"type":1,"interval":13958,"actionType":1,"y":117,"x":344},
{"type":1,"interval":14007,"actionType":1,"y":119,"x":344},
{"type":1,"interval":14058,"actionType":1,"y":119,"x":342},
{"type":1,"interval":14107,"actionType":1,"y":119,"x":340},
{"type":1,"interval":14174,"actionType":1,"y":119,"x":339},
{"type":1,"interval":14797,"actionType":1,"y":120,"x":339},
{"type":0,"interval":23145,"actionType":1,"y":266,"x":580},
{"type":1,"interval":23311,"actionType":1,"y":266,"x":579},
{"type":1,"interval":23329,"actionType":1,"y":266,"x":578},
{"type":1,"interval":23361,"actionType":1,"y":266,"x":572},
{"type":1,"interval":23378,"actionType":1,"y":266,"x":569},
{"type":1,"interval":23412,"actionType":1,"y":268,"x":565},
{"type":1,"interval":23428,"actionType":1,"y":269,"x":562},
{"type":1,"interval":23445,"actionType":1,"y":269,"x":560},
{"type":1,"interval":23461,"actionType":1,"y":271,"x":555},
{"type":1,"interval":23478,"actionType":1,"y":272,"x":553},
{"type":1,"interval":23511,"actionType":1,"y":273,"x":547},
{"type":1,"interval":23544,"actionType":1,"y":273,"x":546},
{"type":1,"interval":23562,"actionType":1,"y":274,"x":542},
{"type":1,"interval":23579,"actionType":1,"y":274,"x":541},
{"type":1,"interval":23595,"actionType":1,"y":274,"x":540},
{"type":1,"interval":23612,"actionType":1,"y":274,"x":538},
{"type":1,"interval":23629,"actionType":1,"y":274,"x":536},
{"type":1,"interval":23646,"actionType":1,"y":276,"x":534},
{"type":1,"interval":23678,"actionType":1,"y":276,"x":533},
{"type":1,"interval":23696,"actionType":1,"y":276,"x":531},
{"type":1,"interval":23728,"actionType":1,"y":276,"x":529},
{"type":1,"interval":23745,"actionType":1,"y":277,"x":528},
{"type":1,"interval":23782,"actionType":1,"y":277,"x":525},
{"type":1,"interval":23811,"actionType":1,"y":277,"x":522},
{"type":1,"interval":23829,"actionType":1,"y":277,"x":521},
{"type":1,"interval":23861,"actionType":1,"y":277,"x":518},
{"type":1,"interval":23894,"actionType":1,"y":277,"x":515},
{"type":1,"interval":23911,"actionType":1,"y":277,"x":513},
{"type":1,"interval":23946,"actionType":1,"y":277,"x":511},
{"type":1,"interval":23979,"actionType":1,"y":277,"x":509},
{"type":1,"interval":24030,"actionType":1,"y":277,"x":505},
{"type":1,"interval":24061,"actionType":1,"y":277,"x":501},
{"type":1,"interval":24078,"actionType":1,"y":277,"x":500},
{"type":1,"interval":24111,"actionType":1,"y":277,"x":499},
{"type":1,"interval":24145,"actionType":1,"y":277,"x":498},
{"type":1,"interval":24195,"actionType":1,"y":277,"x":496},
{"type":1,"interval":24229,"actionType":1,"y":277,"x":494},
{"type":1,"interval":24245,"actionType":1,"y":278,"x":492},
{"type":1,"interval":24278,"actionType":1,"y":278,"x":491},
{"type":1,"interval":24296,"actionType":1,"y":278,"x":488},
{"type":1,"interval":24312,"actionType":1,"y":278,"x":487},
{"type":1,"interval":24328,"actionType":1,"y":279,"x":484},
{"type":1,"interval":24345,"actionType":1,"y":279,"x":481},
{"type":1,"interval":24395,"actionType":1,"y":281,"x":480},
{"type":1,"interval":24428,"actionType":1,"y":282,"x":479},
{"type":1,"interval":24462,"actionType":1,"y":283,"x":477},
{"type":1,"interval":24479,"actionType":1,"y":284,"x":477},
{"type":1,"interval":24495,"actionType":1,"y":284,"x":476},
{"type":1,"interval":24512,"actionType":1,"y":285,"x":476},
{"type":1,"interval":24562,"actionType":1,"y":288,"x":476},
{"type":1,"interval":24578,"actionType":1,"y":290,"x":475},
{"type":1,"interval":24596,"actionType":1,"y":291,"x":475},
{"type":1,"interval":24628,"actionType":1,"y":294,"x":475},
{"type":0,"interval":24662,"actionType":1,"y":298,"x":475},
{"type":1,"interval":24695,"actionType":1,"y":300,"x":475},
{"type":1,"interval":24712,"actionType":1,"y":303,"x":475},
{"type":1,"interval":24746,"actionType":1,"y":306,"x":475},
{"type":1,"interval":24762,"actionType":1,"y":308,"x":475},
{"type":1,"interval":24778,"actionType":1,"y":309,"x":475},
{"type":1,"interval":24797,"actionType":1,"y":312,"x":475},
{"type":1,"interval":24846,"actionType":1,"y":315,"x":475},
{"type":1,"interval":24879,"actionType":1,"y":318,"x":475},
```

{"type":1,"interval":24929,"actionType":1,"y":322,"x":475},
{"type":1,"interval":24962,"actionType":1,"y":325,"x":475},
{"type":1,"interval":24979,"actionType":1,"y":328,"x":475},
{"type":1,"interval":24995,"actionType":1,"y":330,"x":475},
{"type":1,"interval":25030,"actionType":1,"y":335,"x":475},
{"type":1,"interval":25078,"actionType":1,"y":339,"x":475},
{"type":1,"interval":25112,"actionType":1,"y":342,"x":475},
{"type":1,"interval":25144,"actionType":1,"y":343,"x":475},
{"type":1,"interval":25162,"actionType":1,"y":345,"x":475},
{"type":1,"interval":25196,"actionType":1,"y":346,"x":475},
{"type":1,"interval":25212,"actionType":1,"y":347,"x":475},
{"type":1,"interval":25228,"actionType":1,"y":349,"x":475},
{"type":1,"interval":25246,"actionType":1,"y":350,"x":475},
{"type":1,"interval":25262,"actionType":1,"y":353,"x":475},
{"type":1,"interval":25298,"actionType":1,"y":356,"x":475},
{"type":1,"interval":25329,"actionType":1,"y":359,"x":475},
{"type":1,"interval":25346,"actionType":1,"y":360,"x":475},
{"type":1,"interval":25379,"actionType":1,"y":363,"x":475},
{"type":1,"interval":25396,"actionType":1,"y":366,"x":475},
{"type":1,"interval":25411,"actionType":1,"y":367,"x":475},
{"type":1,"interval":25428,"actionType":1,"y":369,"x":475},
{"type":1,"interval":25445,"actionType":1,"y":372,"x":475},
{"type":1,"interval":25479,"actionType":1,"y":376,"x":475},
{"type":1,"interval":25512,"actionType":1,"y":380,"x":475},
{"type":1,"interval":25529,"actionType":1,"y":382,"x":475},
{"type":1,"interval":25547,"actionType":1,"y":383,"x":475},
{"type":1,"interval":25596,"actionType":1,"y":387,"x":475},
{"type":1,"interval":25612,"actionType":1,"y":390,"x":475},
{"type":1,"interval":25646,"actionType":1,"y":391,"x":475},
{"type":1,"interval":25680,"actionType":1,"y":396,"x":475},
{"type":1,"interval":25712,"actionType":1,"y":398,"x":475},
{"type":1,"interval":25763,"actionType":1,"y":400,"x":475},
{"type":1,"interval":25779,"actionType":1,"y":401,"x":475},
{"type":1,"interval":25797,"actionType":1,"y":403,"x":475},
{"type":1,"interval":25812,"actionType":1,"y":404,"x":475},
{"type":1,"interval":25829,"actionType":1,"y":405,"x":476},
{"type":1,"interval":25845,"actionType":1,"y":407,"x":476},
{"type":1,"interval":25879,"actionType":1,"y":410,"x":476},
{"type":1,"interval":25913,"actionType":1,"y":411,"x":476},
{"type":1,"interval":25929,"actionType":1,"y":412,"x":476},
{"type":1,"interval":25945,"actionType":1,"y":413,"x":476},
{"type":1,"interval":25980,"actionType":1,"y":416,"x":476},
{"type":1,"interval":25997,"actionType":1,"y":416,"x":478},
{"type":1,"interval":26030,"actionType":1,"y":419,"x":478},
{"type":1,"interval":26046,"actionType":1,"y":420,"x":478},
{"type":1,"interval":26079,"actionType":1,"y":421,"x":478},
{"type":1,"interval":26096,"actionType":1,"y":422,"x":478},
{"type":1,"interval":26146,"actionType":1,"y":423,"x":478},
{"type":1,"interval":26180,"actionType":1,"y":425,"x":479},
{"type":1,"interval":26230,"actionType":1,"y":429,"x":479},
{"type":1,"interval":26247,"actionType":1,"y":430,"x":481},
{"type":1,"interval":26296,"actionType":1,"y":430,"x":482},
{"type":1,"interval":26346,"actionType":1,"y":430,"x":483},
{"type":1,"interval":26412,"actionType":1,"y":430,"x":484},
{"type":1,"interval":26447,"actionType":1,"y":430,"x":485},
{"type":1,"interval":26480,"actionType":1,"y":430,"x":488},
{"type":1,"interval":26514,"actionType":1,"y":430,"x":493},
{"type":1,"interval":26546,"actionType":1,"y":431,"x":498},
{"type":1,"interval":26647,"actionType":1,"y":431,"x":500},
{"type":1,"interval":26703,"actionType":1,"y":431,"x":501},
{"type":1,"interval":26730,"actionType":1,"y":431,"x":503},
{"type":1,"interval":26746,"actionType":1,"y":433,"x":506},
{"type":1,"interval":26763,"actionType":1,"y":433,"x":509},
{"type":1,"interval":26782,"actionType":1,"y":434,"x":512},
{"type":1,"interval":26796,"actionType":1,"y":434,"x":515},
{"type":1,"interval":26831,"actionType":1,"y":435,"x":519},
{"type":1,"interval":26864,"actionType":1,"y":435,"x":522},
{"type":1,"interval":26914,"actionType":1,"y":435,"x":524},
{"type":1,"interval":26946,"actionType":1,"y":435,"x":527},
{"type":1,"interval":26997,"actionType":1,"y":436,"x":535},
{"type":1,"interval":27013,"actionType":1,"y":436,"x":539},
{"type":1,"interval":27030,"actionType":1,"y":436,"x":543},
{"type":1,"interval":27047,"actionType":1,"y":436,"x":547},
{"type":1,"interval":27064,"actionType":1,"y":436,"x":551},
{"type":1,"interval":27113,"actionType":1,"y":436,"x":558},
{"type":1,"interval":27130,"actionType":1,"y":436,"x":561},
{"type":1,"interval":27146,"actionType":1,"y":436,"x":563},
{"type":1,"interval":27163,"actionType":1,"y":436,"x":564},
{"type":1,"interval":27180,"actionType":1,"y":436,"x":566},
{"type":1,"interval":27213,"actionType":1,"y":436,"x":570},
{"type":1,"interval":27230,"actionType":1,"y":436,"x":571},
{"type":1,"interval":27246,"actionType":1,"y":436,"x":574},
{"type":1,"interval":27263,"actionType":1,"y":436,"x":575},
{"type":1,"interval":27281,"actionType":1,"y":436,"x":578},
{"type":1,"interval":27316,"actionType":1,"y":436,"x":582},
{"type":1,"interval":27348,"actionType":1,"y":436,"x":586},
{"type":1,"interval":27365,"actionType":1,"y":436,"x":589},
{"type":1,"interval":27397,"actionType":1,"y":436,"x":591},
{"type":1,"interval":27431,"actionType":1,"y":436,"x":592},
{"type":1,"interval":27447,"actionType":1,"y":436,"x":595},
{"type":1,"interval":27463,"actionType":1,"y":436,"x":598},
{"type":1,"interval":27497,"actionType":1,"y":436,"x":601},
{"type":1,"interval":27530,"actionType":1,"y":436,"x":604},
{"type":1,"interval":27547,"actionType":1,"y":436,"x":607},
{"type":1,"interval":27597,"actionType":1,"y":436,"x":611},
{"type":1,"interval":27631,"actionType":1,"y":436,"x":614},
{"type":1,"interval":27647,"actionType":1,"y":436,"x":615},
{"type":1,"interval":27680,"actionType":1,"y":436,"x":617},
{"type":1,"interval":27714,"actionType":1,"y":436,"x":619},
{"type":1,"interval":27764,"actionType":1,"y":436,"x":625},
{"type":1,"interval":27813,"actionType":1,"y":436,"x":628},
{"type":1,"interval":27863,"actionType":1,"y":435,"x":630},
{"type":1,"interval":27882,"actionType":1,"y":435,"x":633},
{"type":1,"interval":27930,"actionType":1,"y":432,"x":636},
{"type":1,"interval":27946,"actionType":1,"y":431,"x":638},
{"type":1,"interval":27963,"actionType":1,"y":430,"x":638},
{"type":1,"interval":27979,"actionType":1,"y":430,"x":639},
{"type":1,"interval":28013,"actionType":1,"y":428,"x":641},
{"type":1,"interval":28048,"actionType":1,"y":426,"x":642},
{"type":1,"interval":28081,"actionType":1,"y":423,"x":645},
{"type":1,"interval":28131,"actionType":1,"y":417,"x":646},
{"type":1,"interval":28163,"actionType":1,"y":414,"x":646},
{"type":1,"interval":28198,"actionType":1,"y":404,"x":648},
{"type":1,"interval":28248,"actionType":1,"y":399,"x":648},
{"type":1,"interval":28280,"actionType":1,"y":392,"x":648},
{"type":1,"interval":28314,"actionType":1,"y":386,"x":648},
{"type":1,"interval":28347,"actionType":1,"y":384,"x":648},
{"type":1,"interval":28363,"actionType":1,"y":378,"x":648},
{"type":1,"interval":28397,"actionType":1,"y":374,"x":648},
{"type":1,"interval":28431,"actionType":1,"y":368,"x":648},
{"type":1,"interval":28447,"actionType":1,"y":364,"x":648},
{"type":1,"interval":28480,"actionType":1,"y":359,"x":648},
{"type":1,"interval":28513,"actionType":1,"y":356,"x":648},
{"type":1,"interval":28531,"actionType":1,"y":352,"x":648},
{"type":1,"interval":28564,"actionType":1,"y":347,"x":648},
{"type":1,"interval":28597,"actionType":1,"y":346,"x":648},
{"type":1,"interval":28614,"actionType":1,"y":340,"x":648},
{"type":1,"interval":28648,"actionType":1,"y":337,"x":648},
{"type":1,"interval":28665,"actionType":1,"y":334,"x":648},
{"type":1,"interval":28697,"actionType":1,"y":329,"x":648},
{"type":1,"interval":28731,"actionType":1,"y":323,"x":646},
{"type":1,"interval":28747,"actionType":1,"y":321,"x":646},
{"type":1,"interval":28763,"actionType":1,"y":316,"x":646},
{"type":1,"interval":28781,"actionType":1,"y":314,"x":645},
{"type":1,"interval":28798,"actionType":1,"y":311,"x":645},
{"type":1,"interval":28833,"actionType":1,"y":307,"x":645},
{"type":1,"interval":28880,"actionType":1,"y":303,"x":644},
{"type":1,"interval":28916,"actionType":1,"y":301,"x":643},
{"type":1,"interval":28947,"actionType":1,"y":297,"x":642},
{"type":1,"interval":28964,"actionType":1,"y":294,"x":642},
{"type":1,"interval":28998,"actionType":1,"y":290,"x":640},
{"type":1,"interval":29047,"actionType":1,"y":286,"x":639},
{"type":1,"interval":29088,"actionType":1,"y":282,"x":638},
{"type":1,"interval":29115,"actionType":1,"y":281,"x":636},
{"type":1,"interval":29148,"actionType":1,"y":279,"x":636},
{"type":1,"interval":29164,"actionType":1,"y":278,"x":636},
{"type":1,"interval":29199,"actionType":1,"y":278,"x":635},
{"type":1,"interval":29264,"actionType":1,"y":277,"x":634},
{"type":1,"interval":29314,"actionType":1,"y":275,"x":631},
{"type":1,"interval":29331,"actionType":1,"y":274,"x":630},
{"type":1,"interval":29348,"actionType":1,"y":272,"x":628},
{"type":1,"interval":29364,"actionType":1,"y":271,"x":627},
{"type":1,"interval":29382,"actionType":1,"y":270,"x":625},
{"type":1,"interval":29431,"actionType":1,"y":266,"x":622},
{"type":1,"interval":29464,"actionType":1,"y":265,"x":619},
{"type":1,"interval":29481,"actionType":1,"y":265,"x":618},
{"type":1,"interval":29516,"actionType":1,"y":265,"x":617},
{"type":1,"interval":29565,"actionType":1,"y":265,"x":616}, -continued

```
{"type":1,"interval":29599,"actionType":1,"y":265,"x":615},
{"type":1,"interval":29632,"actionType":1,"y":265,"x":613},
{"type":1,"interval":29648,"actionType":1,"y":265,"x":612},
{"type":1,"interval":29682,"actionType":1,"y":265,"x":607},
{"type":1,"interval":29698,"actionType":1,"y":265,"x":606},
{"type":1,"interval":29732,"actionType":1,"y":265,"x":602},
{"type":1,"interval":29766,"actionType":1,"y":265,"x":599},
{"type":1,"interval":29783,"actionType":1,"y":265,"x":597},
{"type":1,"interval":29814,"actionType":1,"y":265,"x":596},
{"type":1,"interval":29864,"actionType":1,"y":265,"x":592},
{"type":1,"interval":29881,"actionType":1,"y":265,"x":589},
{"type":1,"interval":29898,"actionType":1,"y":265,"x":588},
{"type":1,"interval":29931,"actionType":1,"y":265,"x":584},
{"type":1,"interval":29965,"actionType":1,"y":265,"x":582},
{"type":1,"interval":29981,"actionType":1,"y":265,"x":580},
{"type":1,"interval":30014,"actionType":1,"y":265,"x":579},
{"type":1,"interval":30047,"actionType":1,"y":265,"x":578},
{"type":1,"interval":30064,"actionType":1,"y":265,"x":577},
{"type":1,"interval":30114,"actionType":1,"y":265,"x":576},
{"type":1,"interval":30198,"actionType":1,"y":265,"x":575},
{"type":1,"interval":30414,"actionType":1,"y":266,"x":575},
{"type":1,"interval":30422,"actionType":1,"y":266,"x":575}],
"clearTime":[17.29356,32.23225],
"clearData":[1,2]}
```

Figure 3:
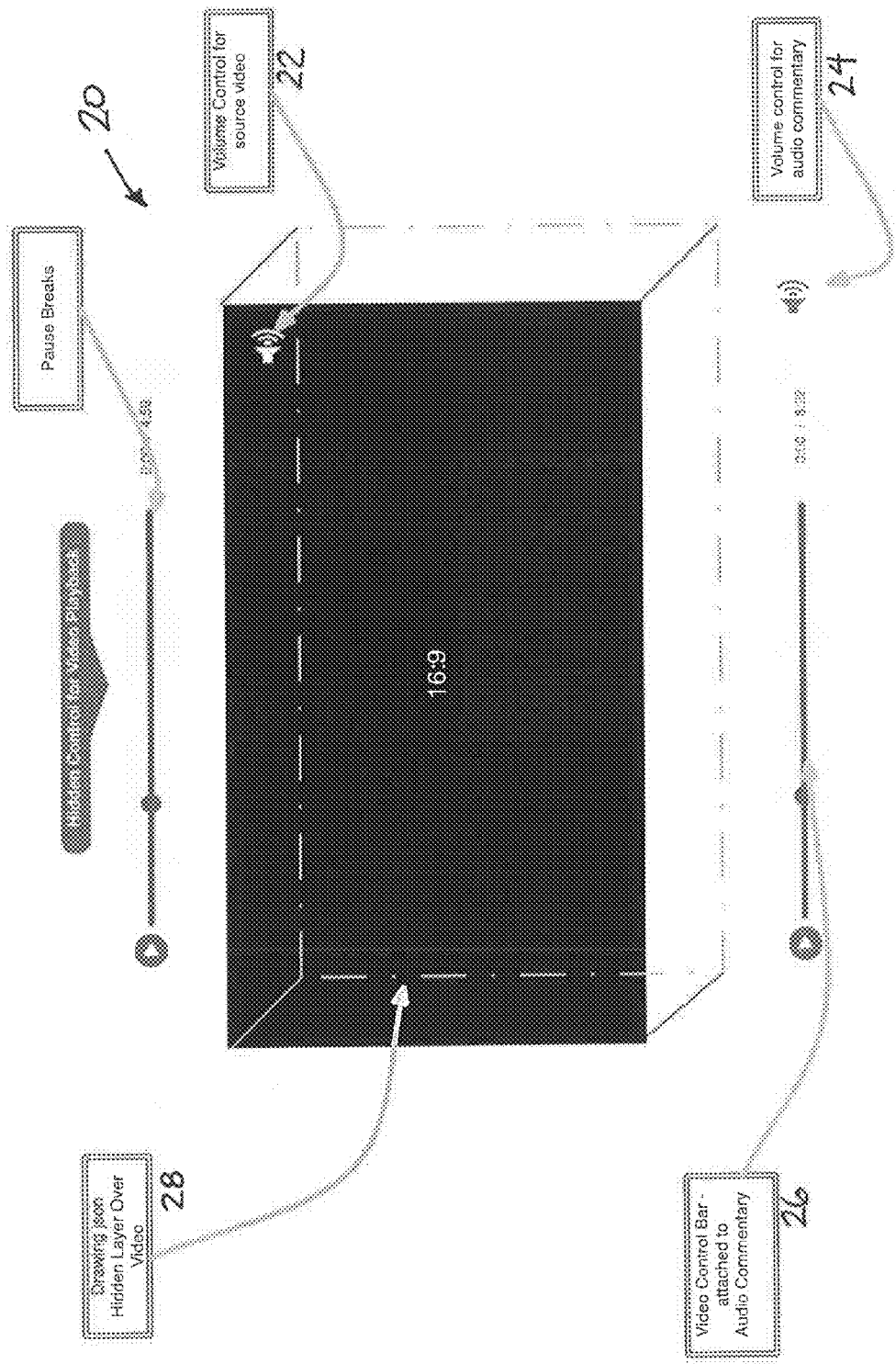
FIG. 3 is a diagram illustrating media player component 20 of the software application described herein, allowing playback of a source audio/video file or stream with an audio track overlaid and/or with graphical information overlaid thereon.

FIG. 3 is a diagram illustrating media player component 20 of the software application described herein, allowing playback of a source audio/video file or stream with an audio track overlaid and/or with graphical information overlaid thereon. Media player component 20 is a custom media player implemented via a processor of a computer system, for example, that accepts one video input and two audio inputs with two separate audio volume controls. The scrubber control, which governs the playback and duration, is linked to the secondary (overlaid) audio track. The player provides the ability for the video to continue playing even if the secondary audio track is over, which occurs when the video duration is longer than the audio that has been recorded.

An audio pause array (described above with respect to FIG. 2) is read by the media player component and an automatic event is triggered when the pause timestamp matches the primary audio track timestamp. The automatic event will trigger the video to play again once the video has been paused for the time specified in the pause array.

As an example of the operation of the software application including the media player component, a user may upload a video to be evaluated to a website offering evaluation and/or coaching services. After the evaluator has recorded audio commentary and overlaid that commentary on the source video file, the user is able to watch their source video while hearing the evaluator's comments, and the video pauses that are inserted at intervals defined by the evaluator will be included in the playback.

Playback of an evaluated video is handled by combining the source video and audio, the recorded audio commentary, pause breaks and evaluator drawing into one video player. Separate audio controls 22 and 24 are provided to govern source audio and recorded commentary audio, respectively. Video control bar 26 is attached to the recorded commentary (duration), and the audio commentary serves as an anchor for the other components during playback.

When the play button is invoked on video control bar 26, the video and audio commentary start simultaneously. The system also reads pause breaks and drawing arrays, and when the audio commentary time hits a pause break interval, the video pauses for the expressed duration, while the audio commentary continues to play. In addition, when the audio commentary hits an index time value in the drawing array, the system reads that index and performs the drawing from the drawing array in drawing layer 28 overlaid over the source video. When the audio commentary reaches a timestamp from a clearTime command in the array, the drawing layer is cleared from the media player.

If the video length is greater than then audio commentary length, the video will continue to play even if the audio commentary has ended, until the video control bar reaches 100%. If the video length is less than the audio commentary length, the video will freeze on the final frame while the audio commentary and drawing functions continue until complete.

Figure 4:
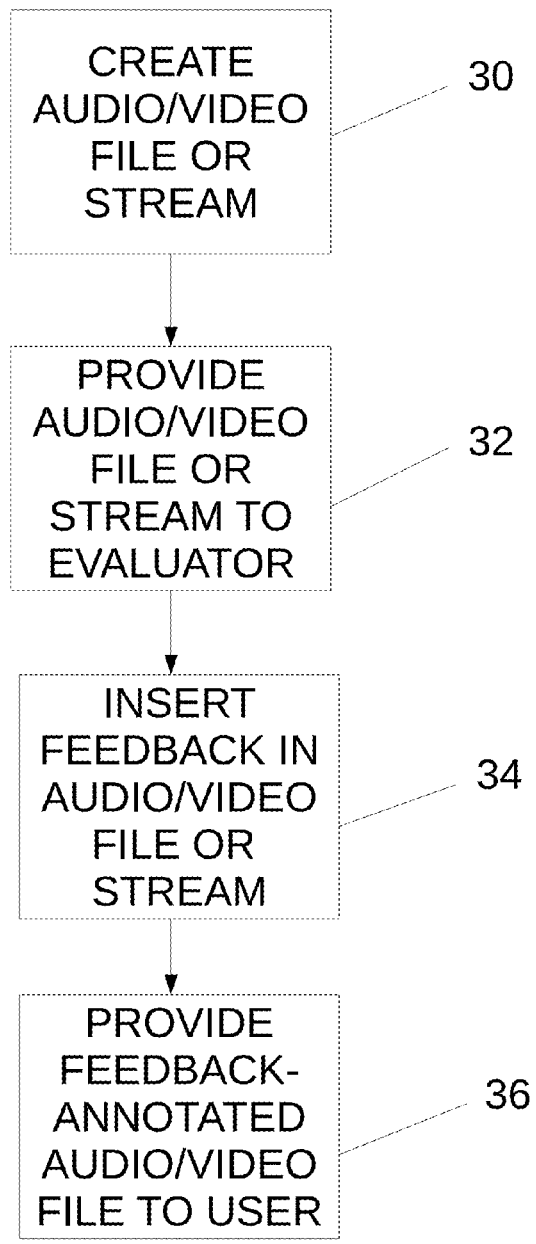
FIG. 4 is a flow diagram illustrating a method of submitting an audio/video file or stream for evaluation, allowing feedback to be provided by an evaluator, and playing back the audio/video file with the evaluator's feedback according to an embodiment of the present invention.

FIG. 4 is a flow diagram illustrating a method of submitting an audio/video file or stream for evaluation, allowing feedback to be provided by an evaluator, and playing back the audio/video file with the evaluator's feedback according to an embodiment of the present invention. Initially, at step 30, an audio/video file or stream is created, which shows an activity of some kind being performed. The audio/video file or stream may be generated by recording the performance of the activity, such as with a video camera or an audio recorder for example. Then, at step 32, the audio/video file or stream is provided to an evaluator for review and feedback. This step may be executed by uploading an audio/video file to a website, by mailing or otherwise delivering a physical copy of an audio/video recording, or by other means. Once the audio/video file or stream has been received by the evaluator, feedback is provided by the evaluator at step 34, following the methods described above with respect to the insertion or audio and/or graphical information. The audio/video file, overlaid with audio and/or graphical information, is then provided back to the original user at step 36. This allows the user to review the original audio/video file with the audio and/or graphical information overlaid thereon, so as to receive the feedback provided by the evaluator.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of obtaining feedback on performance of an activity, the method comprising:
   creating an input audio/video file or stream of performance of an activity;
   providing the input audio/video file or stream to an evaluator; and
   inserting feedback of the evaluator in the input audio/video file or stream to create a feedback-annotated audio/video file;
   wherein the feedback-annotated audio/video file includes at least one pause break during which audio commentary and/or graphical information inserted by the evaluator are presented while audio and video of the input audio/video file or stream are paused.

2. The method of claim 1, wherein creating an input audio/video file or stream comprises recording performance of the activity with a video camera.

3. The method of claim 1, wherein providing the input audio/video file or stream to the evaluator comprises uploading the input audio/video file or stream to a designated web page.

4. The method of claim 1, wherein inserting feedback of the evaluator in the input audio/video file or stream to create a feedback-annotated audio/video file comprises:
- beginning playback of the input audio/video file or stream;
- selectively pausing playback of the input audio/video file or stream using a freeze button that creates the at least one pause break;
- recording audio commentary and/or graphical information while playback of the input audio/video stream is paused; and
- creating the feedback-annotated audio/video file that includes information relating to the at least one pause break and the audio commentary and/or graphical information overlaid on the input audio/video file or stream.

5. The method of claim 4, wherein the information relating to the audio commentary overlaid on the input audio/video file or stream includes a pause break array that defines freeze video and resume video events.

6. The method of claim 4, wherein the information relating to the graphical information overlaid on the input audio/video file or stream includes a drawing array that defines coordinate positions of strokes of a finger or stylus in a drawing capture area.

7. The method of claim 6, wherein the drawing array defines a color selected for the strokes of the finger or stylus in the drawing capture area.

8. The method of claim 6, wherein the drawing array includes commands that indicate when the drawing is cleared during playback of the feedback-annotated audio/video file.

9. The method of claim 1, wherein the input audio/video file or stream is a recorded interaction of a sales presentation, and the evaluator provides feedback on the sales presentation.

10. The method of claim 1, wherein the input audio/video file or stream is a recorded oral presentation and the evaluator provides feedback on the oral presentation.

11. The method of claim 1, wherein the input audio/video file or stream is a recorded performance of a rider participating in a virtual horse show, and the evaluator is a judge providing scoring and/or feedback on the performance of the rider.

12. The method of claim 1, wherein the input audio/video file or stream is a recorded performance of a horse rider preparing for future competitions, and the evaluator is a trainer providing feedback and/or instruction from a location remote from the horse rider.

13. The method of claim 1, wherein the input audio/video file or stream is a recorded performance of an athletic skill, and the evaluator is a coach or trainer providing feedback and/or instruction on the performance of the athletic skill.

* * * * *